(12) United States Patent
Indyk et al.

(10) Patent No.: US 11,724,456 B2
(45) Date of Patent: Aug. 15, 2023

(54) OPTICAL CURING SYSTEM FOR 3D PRINTING

(71) Applicant: Mighty Buildings, Inc., San Francisco, CA (US)

(72) Inventors: Denis Indyk, Tomsk (RU); Aleksei Dubov, Moscow (RU); Slava Solonitsyn, Singapore (SG); Anna Trushina, Tomsk (RU); Dmitry Starodubtsev, Tomsk (RU)

(73) Assignee: Mighty Buildings, Inc., Oakland, CA (US)

( * ) Notice: Subject to any disclaimer, the term of this patent is extended or adjusted under 35 U.S.C. 154(b) by 252 days.

(21) Appl. No.: 16/860,021

(22) Filed: Apr. 27, 2020

(65) Prior Publication Data

US 2021/0078254 A1 Mar. 18, 2021

Related U.S. Application Data

(60) Provisional application No. 62/901,900, filed on Sep. 18, 2019.

(51) Int. Cl.
| | | |
|---|---|---|
| *B29C 64/209* | (2017.01) | |
| *B29C 64/277* | (2017.01) | |
| *B29C 64/241* | (2017.01) | |
| *B33Y 10/00* | (2015.01) | |
| *B33Y 30/00* | (2015.01) | |
| *B29C 64/106* | (2017.01) | |
| *B33Y 50/02* | (2015.01) | |
| *B29C 64/393* | (2017.01) | |

(52) U.S. Cl.
CPC .......... *B29C 64/277* (2017.08); *B29C 64/106* (2017.08); *B29C 64/209* (2017.08); *B29C 64/241* (2017.08); *B33Y 10/00* (2014.12); *B33Y 30/00* (2014.12); *B29C 64/393* (2017.08); *B33Y 50/02* (2014.12)

(58) Field of Classification Search
CPC ... B29C 64/277; B29C 64/241; B29C 64/209; B29C 64/106; B29C 64/393; B29C 64/282; B33Y 10/00; B33Y 30/00; B33Y 50/02
See application file for complete search history.

(56) References Cited

U.S. PATENT DOCUMENTS

| 2011/0298877 A1* | 12/2011 | Blessing | B41J 2/17553 |
| | | | 347/102 |
| 2017/0028434 A1* | 2/2017 | Evans | B29C 64/118 |
| 2017/0066193 A1* | 3/2017 | Kim | B29C 64/241 |

(Continued)

OTHER PUBLICATIONS

English translation of WO 2016/125138 (Year: 2016).*
English translation of JP 2018-122454 (Year: 2018).*

*Primary Examiner* — Joseph S Del Sole
*Assistant Examiner* — Baileigh Kate Darnell
(74) *Attorney, Agent, or Firm* — Cognition IP, P.C.; Edward Steakley; Justin White

(57) ABSTRACT

An optical curing system for a large scale 3D printing system may include a light source housing, a light source, a mounting bracket, a light beam focusing subsystem, and a power source. The light source may be coupled to the light source housing. The mounting bracket may secure the light source housing to a rotary system on the 3D printer. The light beam focusing subsystem is attached to the light source housing. The power source may power the light source during its operation.

20 Claims, 9 Drawing Sheets

(56) References Cited

U.S. PATENT DOCUMENTS

| | | | |
|---|---|---|---|
| 2017/0232637 A1* | 8/2017 | DeMuth | B22F 12/43 |
| | | | 264/497 |
| 2017/0246803 A1* | 8/2017 | Johnson | B29C 64/20 |
| 2018/0065298 A1* | 3/2018 | Tyler | B33Y 50/02 |
| 2018/0098383 A1* | 4/2018 | Veis | H05B 3/009 |
| 2018/0126637 A1* | 5/2018 | Tyler | B29C 64/118 |
| 2019/0210278 A1* | 7/2019 | Hikmet | B29C 64/165 |

* cited by examiner

OPTICAL CURING SYSTEM FOR 3D PRINTING

CROSS-REFERENCE TO RELATED APPLICATIONS

This application claims the benefit of U.S. Provisional Application No. 62/901,900, filed Sep. 18, 2019, which is hereby incorporated by reference in its entirety.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the 3D printed articles were generally models, the industry is quickly advancing by creating 3D printed articles that may be functional parts in more complex systems, such as hinges, tools, structural elements.

In existing 3D printing processes, a 3D object is created by forming layers of material under computer control without molding. For example, 3D information of a structure is determined using computer 3D modeling fragmentation and a prepared mixture can be fed from a nozzle by mechanical control to print the structure.

One serious problem and challenge of 3D printing is that printing materials meeting requirements of certain applications can be very scarce. For example, existing printing materials are mainly organic materials. The organic materials are printed in a molten state at a high temperature via layer by layer deposition. Curing of the organic materials is prone to oxidation decomposition, and the preparation and printing processes may emit unpleasant toxic gases that harm the environment and human health. In addition, the organic materials may be printed under demanding conditions which incur high costs. Structures printed with the organic materials may have poor mechanical properties and are therefore not suitable for certain applications such as constructing livable buildings, thus limiting the application of 3D printing technology to a certain extent.

Other examples of printing materials are mineral, cement-based materials such as concrete. Cement-based materials generally take a long time to solidify. Thus, such materials generally cannot meet performance requirements requiring the material to rapidly solidify in a short period of time. Even though the speed of solidification can be increased by changing the formulation, such increase is usually limited or difficult to control and makes 3D printing impractical for certain circumstances such as constructing a building in one cycle of printing. The 3D printing process with a composite material allows to advance the solidification process, to print the full shells including floors, ceilings/overhangs in a single process, to reach the automation of the printing process to 80%.

In view of the foregoing, there is a need for improvements and/or alternative or additional solutions to improve 3D printing materials and processes.

SUMMARY

Described herein are exemplary systems, apparatus and methods for a 3D printing system for fabricating large scale structures and other types of structures or building components. In one embodiment, there is an optical curing system for a 3D printer which includes a light source housing, a light source, a mounting bracket, a light beam focusing subsystem, and a power source. The light source may be coupled to the light source housing. The mounting bracket may secure the light source housing to a rotary system on the 3D printer. The light beam focusing subsystem may be attached to the light source housing. The power source may power the light source during its operation.

In another embodiment, there is a 3D printing system for fabricating structures. The system includes a printing head, an optical curing system, a rotary system, and a power source. The printing head includes a connector for connection to a feeding system. The feeding system provides or pumps into the connector a light-activated 3D-printable material. The connector is coupled in fluid communication to an extruder. The extruder has a nozzle which is coupled in fluid communication to the extruder.

The optical curing system includes a mounting bracket with one or more attached light emitting devices for emitting light, such as ultra-violet light. Each of light emitting devices may include a light beam reflector, such as a parabolic shaped reflector. The optical curing system may further include one more light sensors configured to detect the intensity of the emitted light from the light emitting devices, or configured to measure an intensity of the emitted light reflected from the extruded material. The light emitting devices may have an attached radiator to help dissipate heat created by the light emitting devices. The optical curing system may further include a lens system where the emitted light of the light emitting devices is focused towards a common focal point by the lens system. The light emitting devices are configured to emit light in a light intensity range required to solidify 3D-printable material extruded from the nozzle.

The light emitting devices may be arranged in multiple linear and/or radial arrays. Each linear or radial array may have two or more light emitting devices. The groupings of the multiple linear or radial arrays form an optical curing module. Two optical curing modules may be positioned on opposite sides of each other to provide application of light from opposite directions to the extruded 3D-printable material. The optical curing modules may be rotated by the rotary system.

The rotary system includes a rotation platform that is configured in a manner to mount the optical curing system and rotate the optical curing system around a longitudinal axis of the extruder. A drive mechanism may be configured to rotate the rotation platform. For example, the drive mechanism may be a belt drive or direct drive, or of other configurations. The power source is operatively coupled to the one or more light emitting devices.

In another embodiment, a 3D printing system may include a printing head comprising a connector to a feeding system, an extruder, a nozzle, a rotation platform, an engine, an optical curing system, a rotary system, and a seal unit.

In other embodiments of the 3D printing system, an optical curing system for a 3D printer may include a light source housing, a light source, a mounting bracket, a light beam reflector, and a power source. The light source may be coupled to the light source housing. The mounting bracket may secure the light source housing to a rotary system on the 3D printer. The light beam reflector may be attached to the light source housing. The power source may power the light source during its operation.

In another embodiment, there is a method for 3D printing large scale structures. The method includes receiving a 3D-printable material into a longitudinal extruder. The longitudinal extruder has a nozzle. The 3D-printable material is extruded out of the nozzle. The extruded 3-printable material is radiated with light emitted from an optical curing assembly which rotates around a longitudinal axis of the extruder thereby applying UV light 360 degrees to the 3D-printable material extruded out of the nozzle. The emitted light may be in a light intensity range from 0.5 to 20 W/cm$^2$ to achieve required solidification of the 3D-printable material while being extruded with a feeding speed of 0.02 to 0.1 m$^3$/h.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
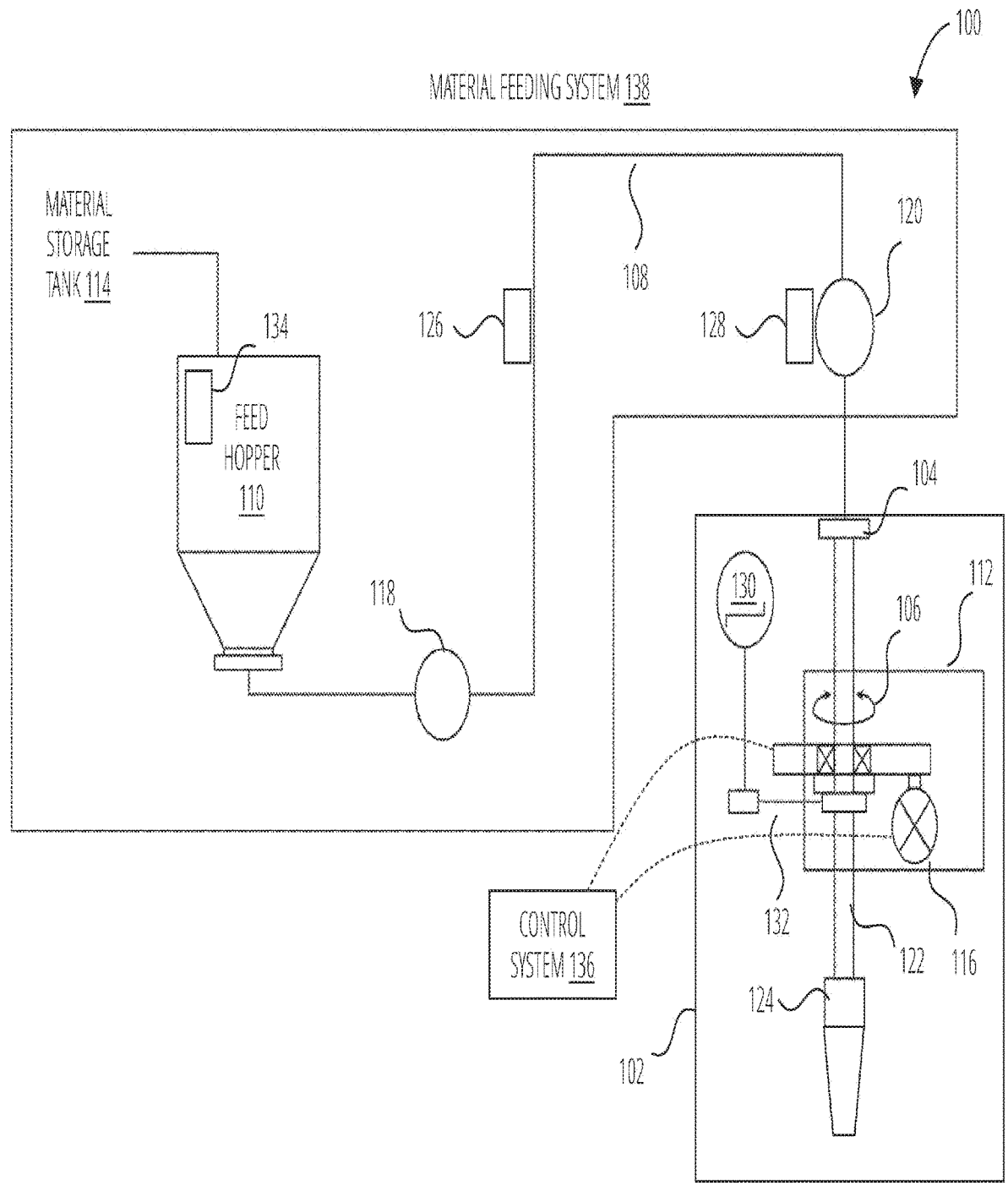
FIG. 1 illustrates an example printing system 100 in accordance with one embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

The printing head system comprises a device for extruding the polymerizable composite material through an aperture of a predetermined shape and profile—the deposition nozzle, mechanism for rotating the nozzle around the printing axis (X, Y, Z and their combinations), light-emitting optical system for curing the material (explained in detail elsewhere in this document), and auxiliary equipment.

An optical curing system may be provided as a system for emitting, concentrating the light beams in order to obtain a properly light-cured solid photopolymerized composite material. The system may be described as an optical system installed on the printing head of the 3D printer to solidify the liquid photopolymerizable composite material which is mainly used in the manufacture of buildings or building components such as walls, floors, ceilings, exterior and interior cladding, furniture etc., or features such as outdoor and indoor features, etc. by 3D printing processes.

To print a building structure a photopolymerizable material is pumped through the pipe system out the printing nozzle of the 3D printer. On leaving the nozzle the liquid photopolymerizable material needs to be effectively exposed to the light emitted from the optical system in order to be solidified by means of the photopolymerization process and to create a building structure layer after layer. To provide proper solidification and printing speed the light emitted is to be effectively concentrated by a light focusing subsystem.

The optical curing system of the 3D printer may include a light emitting subsystem to perform light curing of the photopolymerizable material. The optical curing system may also include a light focusing subsystem to focus the light emitted by the light emitting subsystem to increase the efficiency of the photopolymerization process while 3D printing process. The optical curing system may also include a feedback subsystem to control the photopolymerizable material light curing efficiency.

In some configurations, the light emitting subsystem of the optical curing system may include a plurality of light sources presented by LEDs installed on at least one electronic unit. For better curing of the printing layer the amount of the units may be increased (i.e., 2, 4). The light emitting subsystem may also include a plurality of light sources presented by laser emitters installed on at least one electronic unit. For better curing of the printing layer the amount of the units may be increased (i.e., 2, 4). The light emitting sub system may also include a plurality of light sources (i.e., light emitting devices) presented by lamps installed on at least one electronic unit. For better curing of the printing layer the amount of the units may be increased (i.e., 2, 4).

In some configurations, the light emitting system may include at least one light source (wavelength of the emitted light lies in the range between 10 nm and 1000 micrometers). For some specific reasons (different chemical components may be sensitive to different light wavelengths in order to start solidifying) light sources of different wavelengths and power may be combined in one optical system. For better light curing performance the units with the light sources installed on may be combined to modules. The number of modules varies and depends on the 3D printing parameters.

The light focusing subsystem may be configured to include various components that allow for additional functionality. For instance, the light focusing subsystem may be configured with each light emitting source having its own reflector. The light focusing subsystem may also be configured where each light emitting source has its own lens or lenses. The light focusing subsystem may also be configured with a group of light emitting sources where the subsystem is focused by means of one lens or a group of lenses. The light focusing subsystem may also be configured with a group of light emitting sources where the subsystem is focused by means of one reflector or a group of reflectors. The light focusing subsystem may also be configured where each light emitting source has its own positioning mechanism to adjust light output direction. In an embodiment, the mechanism may be motorized to adjust position on the go. The light focusing subsystem may also be configured where a group of light emitting sources has its own positioning mechanism to adjust light output direction. In an embodiment, the mechanism might be motorized to adjust position on the go. The light focusing subsystem may also be configured where lenses may have an adjustable focal length by using a set of lenses or bendable lens material. The light focusing subsystem may also be configured where reflectors have their own positioning mechanism to control the direction of reflected light. In an embodiment, the mechanism might be motorized to adjust position on the go.

In some configurations, the feedback subsystem may include a plurality of the light-sensitive electronic components presented by photodiodes, photoresistors, phototransistors, photodetectors (position-sensitive, balanced photodetectors, etc.), systems evaluating the direct and reflected light rate (cameras, photometers, etc.) of a variety of construction kinds. The feedback system may also include a central processing unit to control the intensity of the curing light emitted by the light emitting subsystem. The feedback subsystem may also include a feedback line to connect the light-sensitive electronic components with the central processing unit.

Referring not to FIG. 1, the figure illustrates an example printing system 100 in accordance with one embodiment. A printing system 100 comprises a material feeding system 138, a printing head 102, and a control system 136. The material feeding system 138 comprises an input from a material storage tank 114, a material feed hopper 110, pumps for feeding material from the hopper (feeding pump 118 and feeding pump 120), and supply hoses 108 with auxiliary equipment (auxiliary equipment 134, auxiliary equipment 126, and auxiliary equipment 128) to assist that carry of the material to the printing head system 102. The printing head system 102 comprises a connector 104, a rotary system 106, a rotation platform 112, a seal unit 302 (not shown), a curing module 116, an extruder 122, a deposition nozzle 124, and an engine 130 and a belt drive 132 (in some embodiments the drive type may be different) that operate as a drive mechanism 204. In an embodiment, a direct drive mechanism may be utilized.

The control system 136 may be operatively connected to the curing module 116 allowing the control system 136 to control operation of the curing module 116. The control system 136 may be operatively connected to the rotation platform 112 allowing the control system 136 to control operation of the rotation platform 112.

The printing head system 102 comprises a device for extruding the material through an aperture of a predetermined shape and profile. The printing head system 102 includes a deposition nozzle 124, a mechanism for rotating the nozzle around the printing axis (X, Y, Z directions and their combinations), and an ultra-violet (UV) optical system which provides a source of ultraviolet light for curing the material. In some configurations the curing module 116 may be accomplished with UV lighting module 202.

Figure 2:
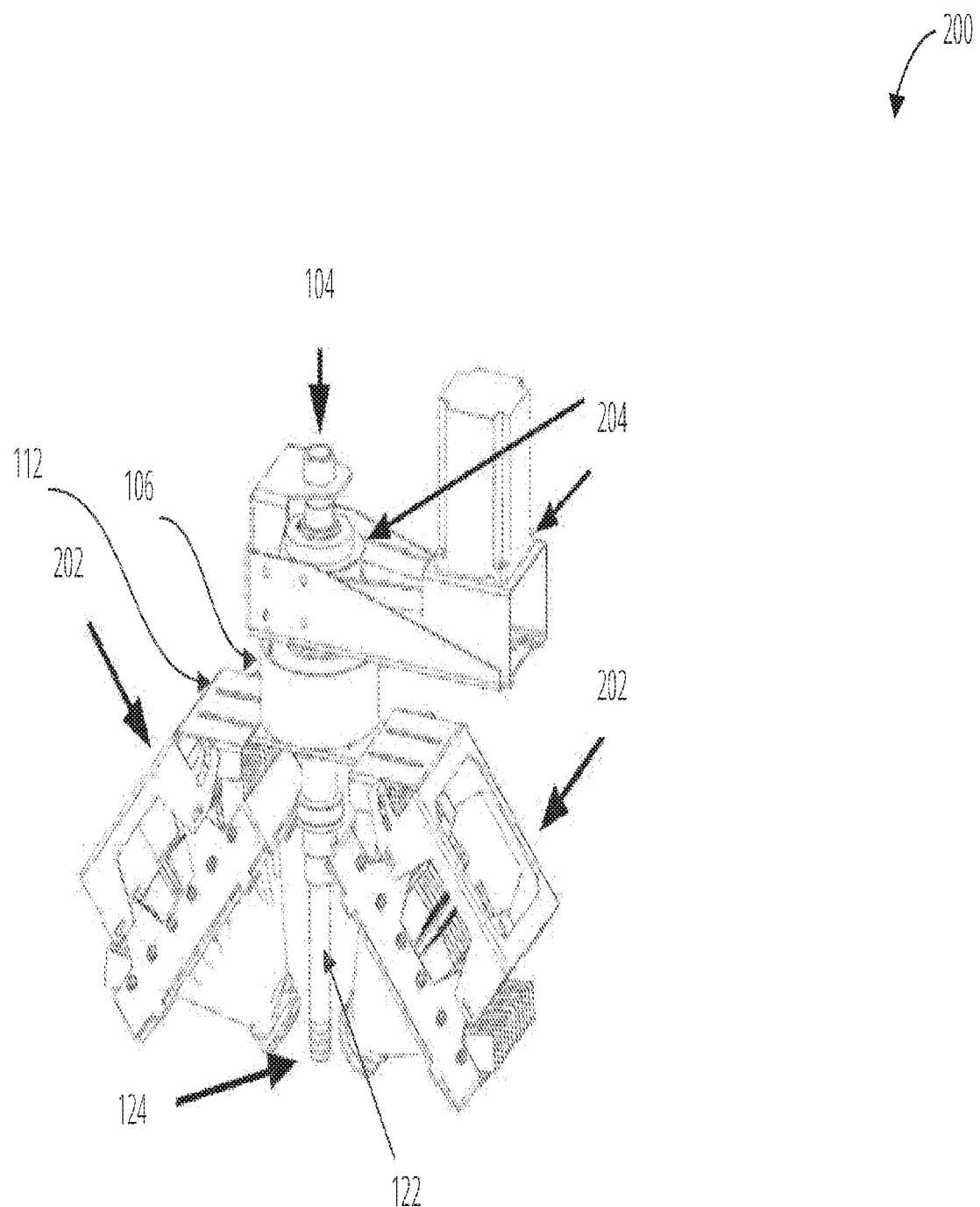
FIG. 2 illustrates an example printing head system 200 in accordance with one embodiment.

FIG. 2 illustrates an example printing head system 200 in accordance with one embodiment. The printing head system 200 comprises one or more lighting modules 202 that serve as a source of UV radiation for the polymerization of material extruded from a longitudinal extruder 122 via the deposition nozzle 124. Electronics allow dynamic adjusting of UV radiation power during the printing to ensure optimal modes. The one or more lighting modules 202 are rotated axially around the nozzle 124 through a drive mechanism 204 that moves the rotation platform 112. The speed of rotation may depend on the type of material being cured, and the rotation speed and light intensity may be adjusted accordingly.

The printing head system 200 serves to feed material from a feeding system to the printable area with the required parameters of the layer to be extruded. The printing head system 200 also provides optimal modes of UV radiation for the polymerization of the material in the field of printing. For this, some modules and mechanisms of the printing head rotate around the axis of the extruder 122—such as the rotation platform and lighting modules 202.

The printing head system 200 comprises a device for extruding the material through an aperture of a predetermined shape and profile via the deposition nozzle 124, a mechanism for rotating the nozzle around the printing axis (X, Y, Z and their combinations), and the UV optical system with one or more lighting modules 202 which provides the source of ultraviolet light for curing the material.

Under the action of UV radiation, an initiator dissolved in a monomer begins the process of photopolymerization. The process of radical polymerization takes place resulting in the formation of a polymer matrix with filler inclusions. Because the polymer is branched and cross-linked, the polymer matrix is hard (and not elastic as rubber or polyethylene are). Adhesion between the layers occurs before the mass undergoes polymerization. Resin is deposited on the previous layer of the printed polymer and wets it. It is then polymerized under the influence of ultraviolet radiation.

A UV optical system may include multiple UV lighting modules 202 and a rotation mechanism 204. The UV optical system may expose the top and sides of a deposited material line with UV light. In one embodiment, each separate UV lighting module 202 emits about 150 Watts (W) of light energy in a controllable manner from 0% to 100%. In other embodiments, the light power may be higher and/or of a variable power. Generated UV light rays are mainly focused on a spot with a diameter in a range of 10-40 mm, such as 20 mm (in some embodiments the spot size may be different). Some of the light may dissipate around the spot and gradually decrease with an increased distance from the center, down to none at a diameter of 90 mm. Therefore, there may be zones of active curing of material just at the nozzle discharge point and secondary (stray) curing of lower layers.

Figure 3:
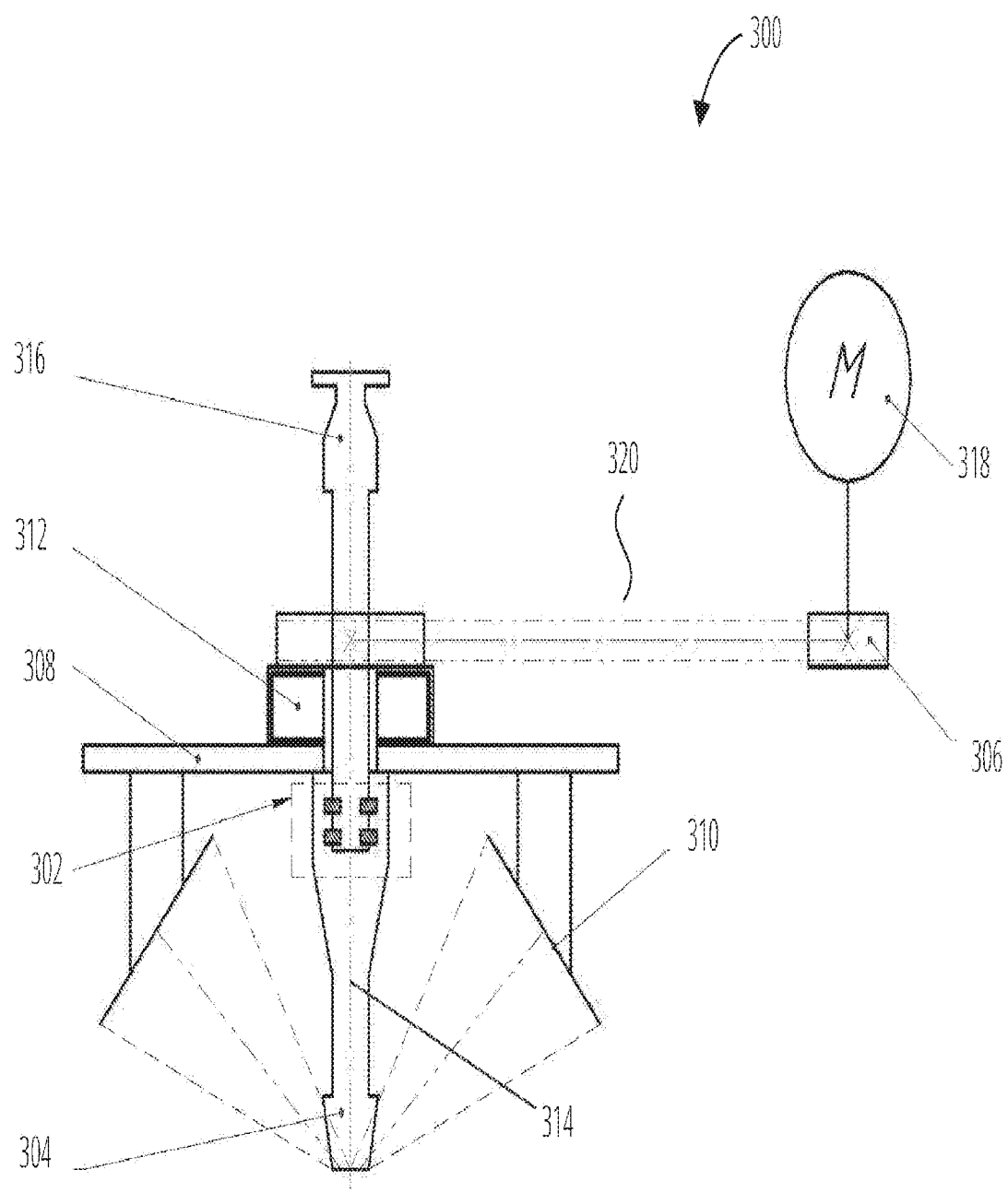
FIG. 3 illustrates an example printing head 300 in accordance with one embodiment.
Figure 4:
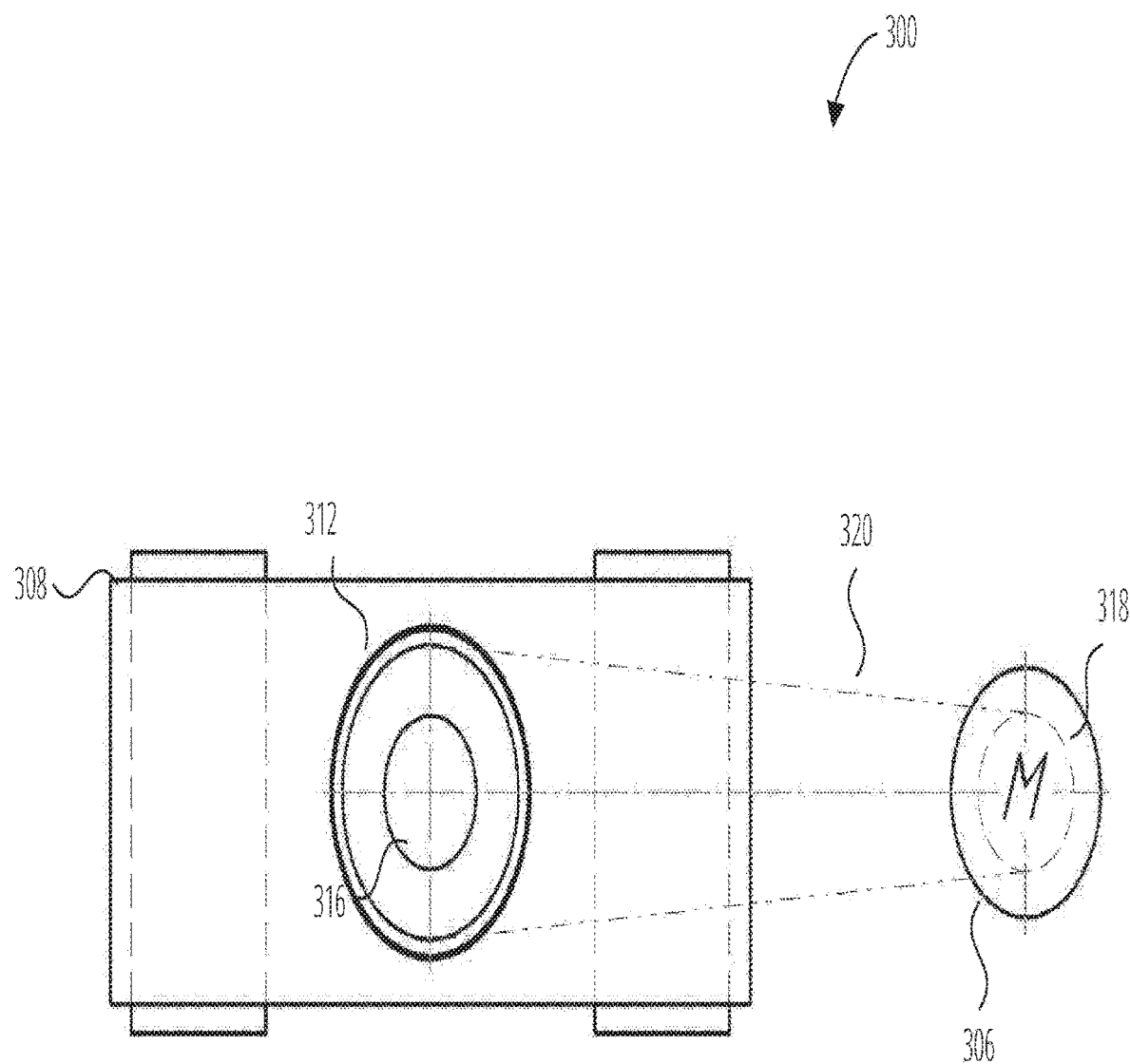
FIG. 4 illustrates an example printing head 300 in accordance with one embodiment.

FIGS. 3-4 illustrate an example printing head 300 in accordance with one embodiment. A printing head 300 comprises a connector 316, a rotary system 312, a rotation platform 308, a seal unit 302, a lighting module 310, an extruder 314, a nozzle 304, and an engine 318 and a belt drive 320 (in some embodiments the drive type may be different) that operate as a drive mechanism 306.

The connector 316 is a node or mechanism that provides a quick connection of the printing head 300 and the feeding system. The connector 316 may be removably coupled to the feeding system.

The extruder 314 is part of the mechanism by which the composite resin (i.e., the 3D-printable material) flows from the feeding system to and through the extrusion nozzle 304. The extrusion nozzle 304 may be removably coupled to the extruder 314. The extrusion nozzle 304 may be a replaceable tool or mechanism for extruding material into the printable area. For example, the extrusion nozzle 304 may be made of pliable silicone blends or other suitable materials. Depending on a desired printing mode, an extrusion nozzle 304 may be of a different configurations and geometry.

The rotation platform 308 is has attached to it one or more lighting modules 310 and parts rotating around the extruder's 314 longitudinal axis. An engine 318 utilizes a belt drive 320 (in some embodiments the drive type may be different) to operate as the drive mechanism 306. The engine 318 may utilize a servomotor, a planetary gearbox, a toothed belt drive and electronic devices for controlling the motor driving rotation of the rotation platform 308. The rotation platform 308 may have a circular opening disposed in the body to allow rotational axis around the extruder 314.

The rotary system 312 is an electrical module that provides power and control signals to the one or more rotating lighting modules 310 when printing. The seal unit 302 is a unit for sealing between the stationary element of the extruder 314 and the rotating one. The seal unit 302 prevents the composite resin leakage. The one or more lighting modules 310 are mechanisms that assist in the curing of the extruded resin. In some configurations, the lighting module 310 may improve reaction conditions associated with the curing of the extruded resin, (e.g., irradiating, heating, drying, etc.).

Figure 5:
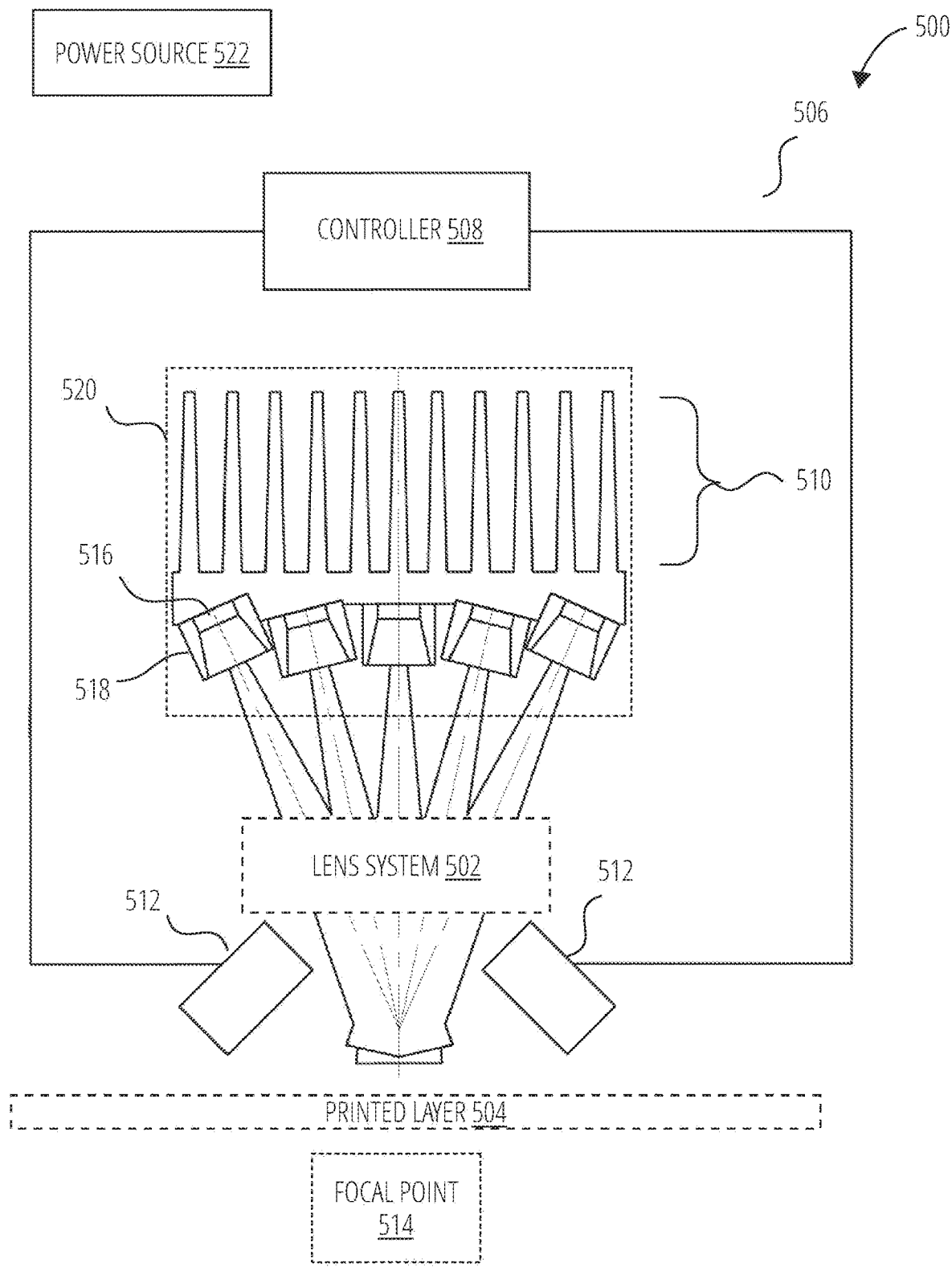
FIG. 5 illustrates an example optical curing system 500 in accordance with one embodiment.

FIG. 5 illustrates an example optical curing system 500 in accordance with one embodiment. An optical curing system 500 comprises at least one light source housing 520 with at least one light source 516 and light beam reflector 518. The light source 516 and the light beam reflector 518 may be arranged in an array and operatively disposed towards a focal point 514 below a printed layer 504. The operation of the light source 516 may be controlled by a controller 508 that communicates with a pair of light sensors 512, via a feedback link 506, and directed towards the printed layer 504. The sensors 512 may be light sensitive units that detect the intensity of the light source 516 and its effectiveness at curing the printed layer 504. The light source housing 520 may include a radiator 510 to help dissipate heat created by the light source 516 during its operation. The optical curing system 500 may also include a lens system 502 positioned between the printed layer 504 and the light source 516 to focus the light emitted by the light source 516 towards the printed layer 504. The optical curing system 500 may be powered by a power source 522 that powers the controller 508 and the light source 516 independently from the 3D printing system.

In some configurations, the optical curing system 500 may include an optical curing module comprising six light source housings with five LED's (i.e., light emitting devices) installed on each and joined together with a mounting bracket (such as a metal frame). The light source housing 520 may include a light focusing subsystem with a reflector (such as a parabolic reflector) that as part of each LED construction. The optical curing system 500 may be installed on a rotating base to be efficiently focused on a layer extruded from the 3D printer's nozzle. The LEDs may be organized in a way to perform a spherical surface with the center located exactly on the point where the liquid photopolymerizable material flows out of the nozzle of the 3D printer.

A feedback system may be included with two light sensitive components located at both sides of the LED's focal spot to control the intensity of the light emitting system. The light sensitive components may be operatively connected with the central processing unit (CPU) which controls the intensity and stability of the emitted light. For example, a light intensity value of emitted light may be determined using one or more light sensors. Based on the determined light intensity value, the power of the light emitted devices may be adjusted (such as increasing or decreasing the power) to achieve a desired light intensity value. The light sensors may be configured to detect the intensity of the emitted light of the light emitting devices and/or measure the intensity of the reflected light from the extruded material.

In some configurations, the light source emits wavelengths in the range of 375-440 nm. The electric power consumption of the light emitting subsystem is 150-400 W. The efficiency rate of the light emitting subsystem may be 40-50%, the light focusing subsystem is 50-80%. The optical power delivered to the photopolymerizable layer in the focal spot may be between 60-300 W, dissipation power may be up to 100 W (angle of expansion 60 degrees). For example, the light emitting subsystem may provide up to 300 W of 390-400 nm light.

Figure 6:
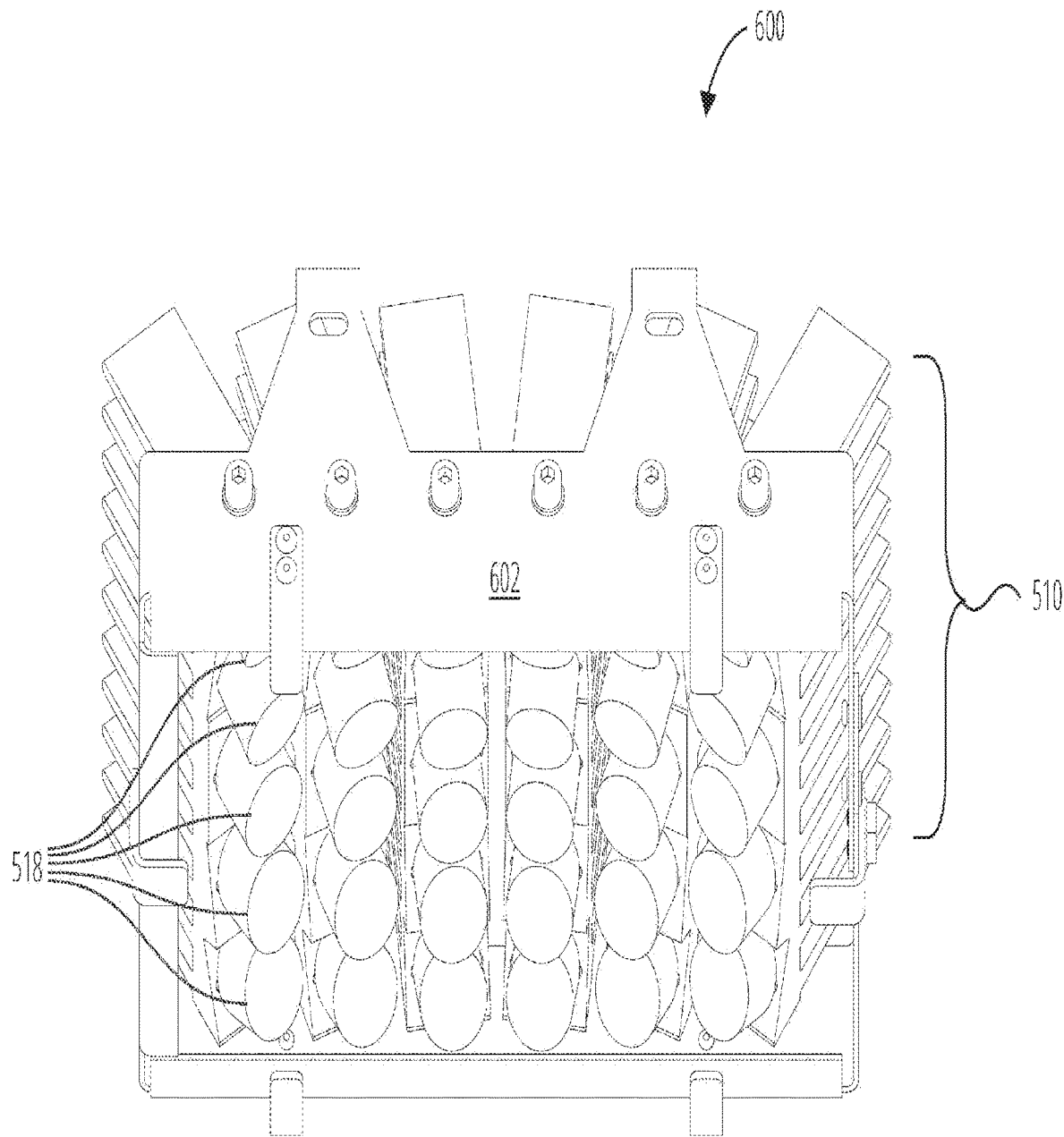
FIG. 6 illustrates an example optical curing module 600 in accordance with one embodiment.
Figure 7:
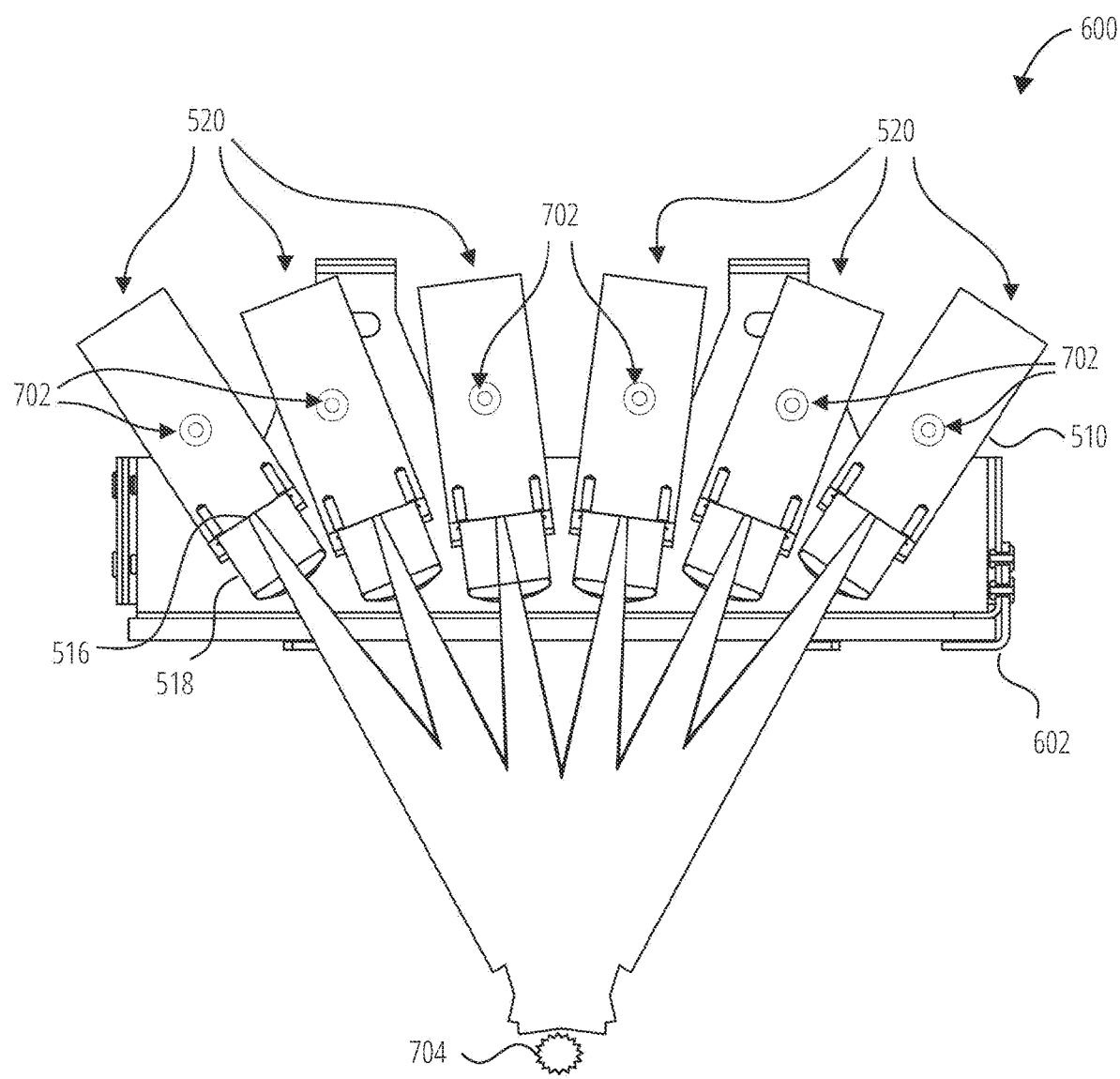
FIG. 7 illustrates an example optical curing module 600 in accordance with one embodiment.

FIGS. 6-7 illustrate an example optical curing module 600 in accordance with one embodiment. The optical curing module 600 comprises at least one light source housing 520. The light source housing 520 may include at least one light source 516 with a light beam reflector 518. Each light source housing 520 may include a radiator 510 to help dissipate heat generated during operation of the light source 516. The light source housing 520 may be mounted to a mounting bracket 602 that mounts to the rotation platform of a printing head. The mounting bracket may be connected directly or indirectly to the rotation platform. The light emitted by the light source 516 may be adjusted through the angling of the light source housing 520. The mounting point 702 between the light source housing 520 and the mounting bracket 602 may allow the light source housing 520 to rotate slightly to orient the emitted beams towards a focal point 704. The light emitting devices may be arranged in multiple linear and/or radial arrays. Each linear or radial array may have two or more light emitting devices. The groupings of the multiple linear or radial arrays form an optical curing module. A linear array has multiple lighting devices aligned along a straight line. A radial array has multiple lighting devices aligned along a radial or curved line.

Figure 8:
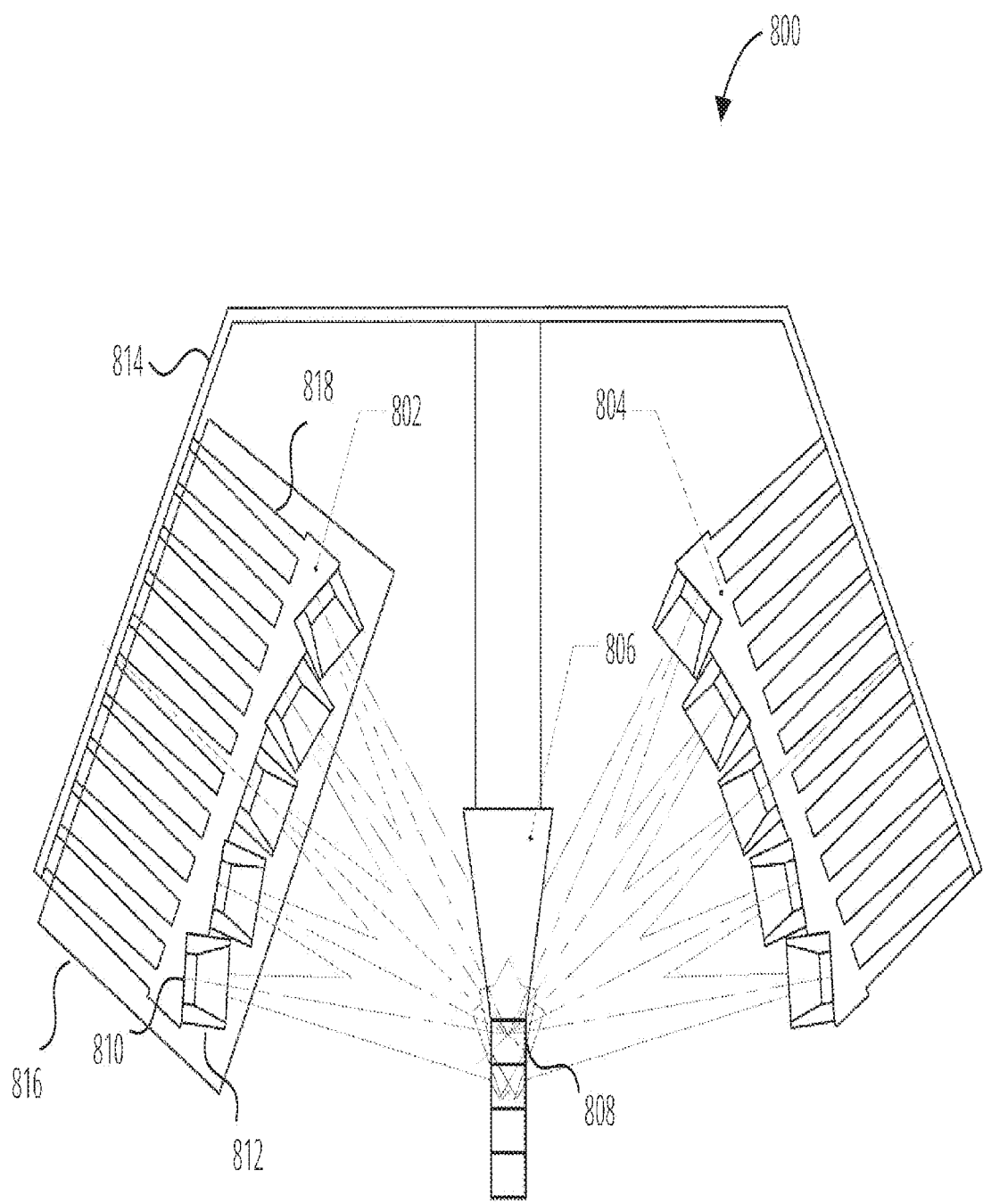
FIG. 8 illustrates an example printing head 800 in accordance with one embodiment.

FIG. 8 illustrates an example printing head 800 in accordance with one embodiment. A printing head 800 includes two optical curing modules. In some configurations, the optical curing system may be installed with two optical curing modules to help achieve better 3D printing parameters (printing speed, polymerizing material solidification speed). Each of the two optical curing modules (first optical curing module 802 and second optical curing module 804) may include at least one light source housing 816 with at least one light source 810 and light beam reflector 812, as well as a radiator 818 to dissipate heat. The two optical curing modules may be positioned opposite each other on a rotation platform 814 across from the nozzle 806. The angle between the two optical curing modules may be equal to 60 degrees. The focal spots from two modules may cover the printed layer 808 of the material from opposite sides and provide better printing parameters and properties of the printed structure.

Figure 9:
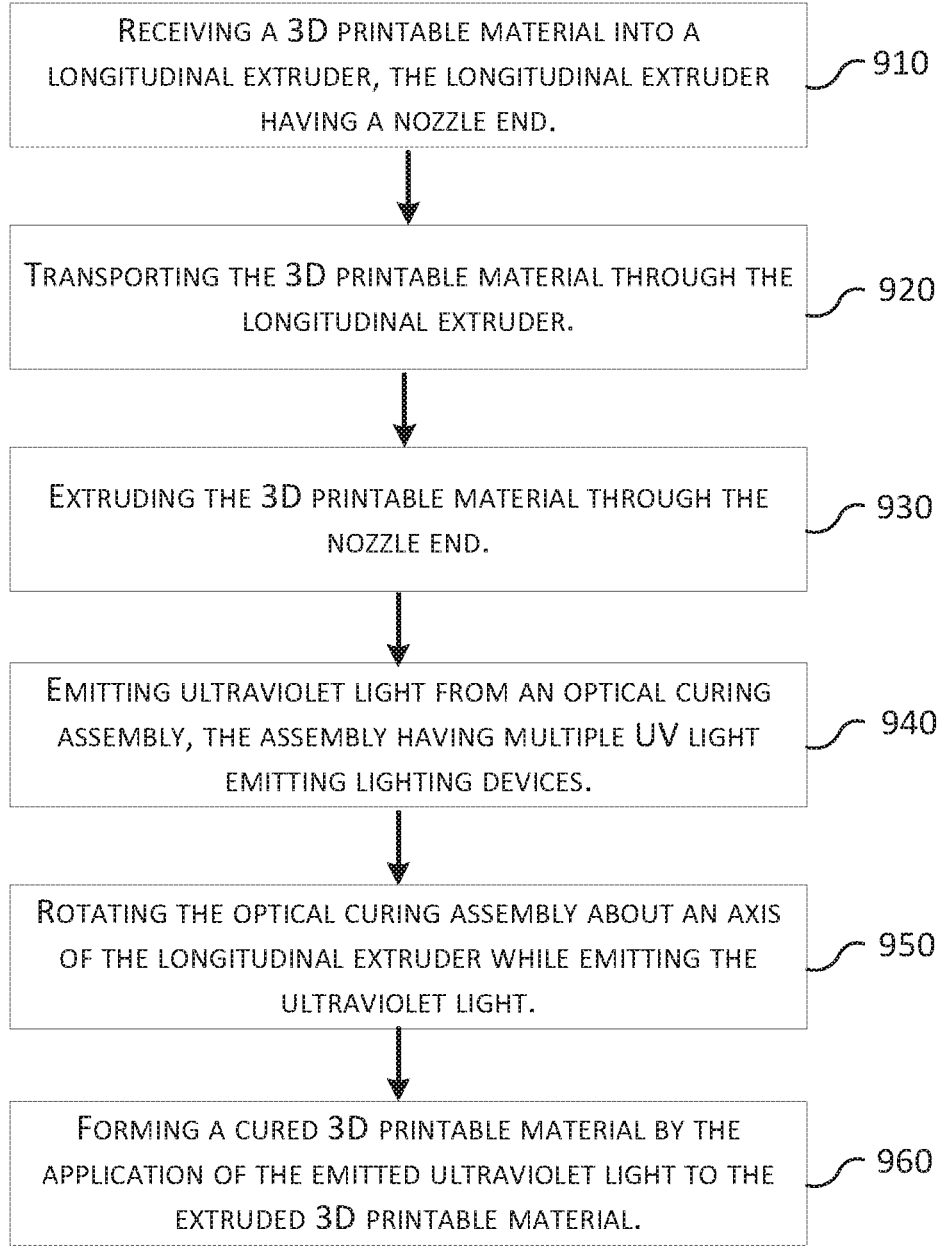
FIG. 9 illustrates a flowchart for an example process 900 for radiating an extruded material with emitted light from multiple light emitting devices.

FIG. 9 illustrates a flowchart for an example process 900 for radiating an extruded material. The process for radiating an extruded 3D-printable material has been previously discussed in the contact of the 3D printing system. However, a summary of the method for radiating an extruded material is described below.

The method includes receiving a 3D printable material into a longitudinal extruder (block 910). The longitudinal extruder may have a nozzle end. The 3D printable material is transported through the longitudinal extruder (block 920). The 3D printable material is extruded out of the nozzle end of the extruder (block 930). Ultraviolet light is emitted from an optical curing assembly having multiple UV light emitting devices (block 940). The optical curing assembly is rotating about an axis of the longitudinal extruder while UV light is emitted (block 950). A cured 3D printable material is formed by the application of the emitted UV light to the extruded 3D printable material (block 960).

The emitted light may be in a light intensity range from 0.5 to 20 W/cm2 to achieve required solidification of the 3D-printable material while being extruded with a feeding speed of 0.02 to 0.1 m3/h. The light emitting devices may be configured to generate ultra-violet radiation in a light frequency in a range anywhere between 10 nm and 1000 micrometers. The particular light frequency needed to cure the 3D-printable material may be dependent on the type of 3D printable material to be radiated.

The emitted light from the light emitting devices may be focused towards a common focal point onto the 3D printable material. Also, the light may be focused in a range of about 10-40 mm, such as 20 mm. A light intensity value of the emitted light may be detected one or more light sensors. Circuitry or computer processor may provide instructions to increase or decrease the power of the light emitting devices based the detected intensity value to achieve a desired light intensity value.

The terminology used herein is for the purpose of describing particular aspects only and is not intended to be limiting of the disclosure. As used herein, the singular forms "a", "an", and "the" are intended to comprise the plural forms as well, unless the context clearly indicates otherwise. It will be further understood that the terms "comprises", "comprising", or a combination thereof, when used in this specification, specify the presence of stated features, integers, steps, operations, elements, and/or components, but do not preclude the presence or addition of one or more other features, integers, steps, operations, elements, components, and/or groups thereof.

While the disclosure has been particularly shown and described with reference to specific examples thereof, it should be understood that changes in the form and details of the disclosed examples may be made without departing from the scope of the invention. Although various advantages, aspects, and objects of the present disclosure have been discussed herein with reference to various examples, it will be understood that the scope of the disclosure should not be limited by reference to such advantages, aspects, and objects. Rather, the scope of the disclosure should be determined with reference to the claims.

What is claimed is:

1. An optical curing system for a 3D printing system, the optical curing system comprising:
   a mounting bracket connected to a rotary system, the rotary system configured to rotate the mounting bracket around a longitudinal axis of an extruder longitudinally disposed through a portion of the mounting bracket; and
   a plurality of lighting modules coupled to the rotary system, each lighting module including multiple light emitting devices, each of the light emitting devices having a light beam reflector, wherein the plurality of lighting modules are distributed about the rotary system and are configured to rotate around the extruder in a manner to focus emitted light towards 3D-printable material as the 3D-printable material is extruded from the extruder, and wherein at least one of the multiple light emitting devices in each of the plurality of lighting modules is configured to emit light towards the 3D-printable material along a light path having a directional component that is substantially perpendicular to the longitudinal axis of the extruder.

2. The optical curing system of claim 1, wherein the emitted light of the light emitting devices has a light intensity range from 0.5 to 20 W/cm2 to achieve solidification of the 3D-printable material extruded with a feeding speed of the 3D-printable material of 0.02 to 0.1 m2/h from the 3D printing system.

3. The optical curing system of claim 1, further comprising one or more light sensors configured to detect an intensity of the emitted light of the light emitting devices, or configured to measure an intensity of the emitted light reflected from the 3D-printable material extruded from the extruder.

4. The optical curing system of claim 1, wherein the light emitting devices include an attached radiator to dissipate heat created by the light emitting devices.

5. The optical curing system of claim 1, further comprising a lens system wherein the emitted light of the light emitting devices is focused towards a common focal point by the lens system.

6. The optical curing system of claim 1, wherein each of the light beam reflectors is a parabolic shape configured to focus the emitted light.

7. The optical curing system of claim 1, further comprising a power source and controller, wherein the power source provides power to the controller and the light emitting devices independently from the 3D printing system.

8. The system of claim 1, wherein the plurality of lighting modules are configured to rotate around the extruder 360 degrees and to emit light 360 degrees towards the 3D-printable material as the 3D-printable material is extruded from the extruder.

9. The system of claim 1, wherein each of the light emitting devices within each lighting module includes a light source, a light source housing, and a mounting point where the light emitting device is rotationally mounted to the mounting bracket.

10. The system of claim 9, wherein each of the light emitting devices within each lighting module are rotationally oriented to direct light emitted therefrom to a focal point where the 3D-printable material is extruded from the extruder.

11. The system of claim 1, wherein the multiple light emitting devices within each lighting module are arranged into arrays having rows and columns within the lighting module, and wherein the angle between the longitudinal axis of the extruder and the light path from each of the multiple light emitting devices in each row of the plurality of lighting modules varies from one row of light emitting devices to another row.

12. The system of claim 1, wherein each lighting module includes an outer housing configured to hold all of the multiple light emitting devices therein and a lens system configured to focus the light from each of the multiple light emitting device collectively towards the 3D-printed material.

13. The system of claim 1, wherein each of the light emitting devices emits UV light and the 3D-printable material is configured to be cured by the UV light.

14. The system of claim 1, wherein each of the multiple light emitting devices in each of the plurality of lighting modules is configured to emit light towards the 3D-printable material along a light path having a directional component that is perpendicular to the longitudinal axis of the extruder.

15. The system of claim 14, wherein the angle between the longitudinal axis of the extruder and the light path from each of the multiple light emitting devices in each of the plurality of lighting modules varies from one light emitting device to another.

16. A 3D printing system for fabricating structures, the system comprising:
- a printing head, the printing head comprising:
  - a connector to connect a feeding system that provides a light-activated 3D-printable material;
  - an extruder having a longitudinal axis and coupled in fluid communication to the connector; and
  - a nozzle coupled in fluid communication with the extruder;
- an optical curing system, the optical curing system comprising:
  - one or more mounting brackets; and
  - a plurality of lighting modules, each lighting module having multiple light emitting devices, wherein each of the light emitting devices includes a light beam reflector, wherein each of the lighting modules are attached to one of the one or more mounting brackets;
- a rotary system, the rotary system comprising:
  - a rotation platform configured to mount the optical curing system and rotate the optical curing system around the longitudinal axis of the extruder to focus light from the rotating lighting modules to the light-activated 3D-printable material as the light-activated 3D-printable material is extruded from the extruder, wherein at least one of the multiple light emitting devices in each of the plurality of lighting modules is configured to emit light towards the 3D-printable material along a light path having a directional component that is perpendicular to the longitudinal axis of the extruder; and
  - a drive mechanism configured to rotate the rotation platform; and
- a power source, the power source operatively coupled to the multiple light emitting devices.

17. The 3D printing system of claim 16, where the light emitting devices emit light in a light intensity range required to solidify 3D-printable material extruded from the nozzle.

18. The 3D printing system of claim 16, wherein the optical curing system further comprises one more light sensors configured to detect an intensity of the emitted light of the light emitting devices, or configured to measure an intensity of the emitted light reflected from the light-activated 3D-printable material extruded from the extruder.

19. The 3D printing system of claim 16, wherein the one or more light emitting devices are arranged in multiple linear or radial arrays, with each linear or radial array having two or more light emitting devices, the grouping of the multiple linear or radial arrays forming an optical curing module.

20. The 3D printing system of claim 19, further comprising two optical curing modules positioned opposite of each other to provide application of light from opposite directions to extruded material.

* * * * *